(12) United States Patent
Phan et al.

(10) Patent No.: US 11,668,837 B2
(45) Date of Patent: *Jun. 6, 2023

(54) SYSTEMS AND METHODS FOR GNSS PROCESSING TO DETERMINE SECONDARY CODE PHASE

(71) Applicant: Rockwell Collins, Inc., Cedar Rapids, IA (US)

(72) Inventors: Huan T. Phan, Cedar Rapids, IA (US); Bernard A. Schnaufer, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/394,089

(22) Filed: Aug. 4, 2021

(65) Prior Publication Data
US 2021/0364649 A1    Nov. 25, 2021

Related U.S. Application Data

(63) Continuation of application No. 16/785,862, filed on Feb. 10, 2020, now Pat. No. 11,086,024, which is a (Continued)

(51) Int. Cl.
*G01S 19/30* (2010.01)
*G01S 19/43* (2010.01)
(Continued)

(52) U.S. Cl.
CPC ............ *G01S 19/30* (2013.01); *G01S 19/256* (2013.01); *G01S 19/37* (2013.01); *G01S 19/43* (2013.01)

(58) Field of Classification Search
CPC ....................................................... G01S 19/30
(Continued)

(56) References Cited

U.S. PATENT DOCUMENTS 5,764,658 A * 6/1998 Sekiguchi ............... H04N 7/52
375/E7.02
9,100,107 B1 * 8/2015 Kutik ..................... G01S 19/29
(Continued)

OTHER PUBLICATIONS

Non-Final Office Action for U.S. Appl. No. 16/101,055 dated Jul. 10, 2019, 10 pages.
(Continued)

*Primary Examiner* — Lihong Yu
(74) *Attorney, Agent, or Firm* — Suiter Swantz pc llo

(57) ABSTRACT

A receiver device to receive an incoming radio frequency (RF) satellite signal from a satellite vehicle includes a processor and computer-readable storage media. The computer-readable storage media is communicably connected to the processor and has instructions stored thereon that, when executed by the processor, causes the processor to track the incoming RF satellite signal in code phase and carrier frequency, the incoming RF satellite signal having a primary pseudorandom (PRN) code and a secondary PRN code modulated thereon, generate an encoded sequence of dot product values of adjacent integrated in-phase (I) and quadrature-phase (Q) components of the incoming RF satellite signal, compare the encoded sequence with expected secondary code chip transitions, determine a secondary code phase for the secondary PRN code based on the comparison, and coherently integrate the secondary code phase with the incoming RF satellite signal to increase an integration interval.

8 Claims, 4 Drawing Sheets

Related U.S. Application Data continuation of application No. 16/101,055, filed on Aug. 10, 2018, now Pat. No. 10,564,290.

(51) Int. Cl.
*G01S 19/25* (2010.01)
*G01S 19/37* (2010.01)

(58) Field of Classification Search
USPC .......................................................... 375/150
See application file for complete search history.

(56) References Cited

U.S. PATENT DOCUMENTS

| | | | |
|---|---|---|---|
| 10,564,290 B1 * | 2/2020 | Phan | G01S 19/43 |
| 2006/0285581 A1 * | 12/2006 | Mattos | G01S 19/30 |
| | | | 375/150 |
| 2007/0159384 A1 * | 7/2007 | Kangas | G01S 19/40 |
| | | | 342/357.46 |

OTHER PUBLICATIONS

Notice of Allowance for U.S. Appl. No. 16/101,055 dated Oct. 18, 2019, 8 pages.

* cited by examiner

SYSTEMS AND METHODS FOR GNSS PROCESSING TO DETERMINE SECONDARY CODE PHASE

CROSS-REFERENCE TO RELATED PATENT APPLICATIONS

This application is a continuation application of U.S. patent application Ser. No. 16/785,862 filed Feb. 10, 2020, which application is itself a continuation application of U.S. patent application Ser. No. 16/101,055 filed Aug. 10, 2018.

Said U.S. patent applications Ser. Nos. 16/785,862 and 16/101,055 are incorporated herein by reference in its entirety.

BACKGROUND

The inventive concepts disclosed herein relate generally to the field of navigation systems. More particularly, embodiments of the inventive concepts disclosed herein relate to systems and methods for GNSS processing to determine secondary code phase.

Global navigational satellite systems (GNSS) refer to a variety of satellite navigation systems used for providing autonomous geo-spatial positioning. These satellite navigation systems include, for example, the global positioning system (GPS), the Russian global orbiting navigational satellite system (GLONASS), the European satellite navigation system Galileo, the Chinese satellite navigation systems BeiDou, and other global or regional systems. Each satellite navigation system can include a constellation of satellites deployed in orbits around the earth that continuously transmit positioning signals. The constellation of satellites can transmit positioning signals over various frequency bands. For example, GPS satellites can transmit L1-band positioning signals having a center frequency of 1575.42 MHz, L2-band positioning signals with a center frequency of 1227.6 MHz, and L5-band positioning signals with a center frequency of 1176.45 MHz. Distinct frequency bands may be associated with different types of navigation applications, e.g., civil or military navigation.

Some satellite navigation systems, such as the GPS system, the Galileo system, and the BeiDou-2 system employ code division multiple access (CDMA). The use of CDMA allows for efficient use of frequency bandwidth by allowing simultaneous transmissions over a single center frequency by multiple satellite transmitters. In particular, satellite transmitters use different ranging codes (or chipping codes), therefore, allowing GNSS receivers to distinguish between positioning signals simultaneously transmitted by different satellite transmitters at a single center frequency. For each satellite transmitter, the respective ranging code can change over time. Also, a given ranging code can be used by different satellite transmitters at different time instances. A GNSS receiver decodes CDMA positioning signals using ranging codes associated with corresponding satellite transmitters. The GNSS receiver uses information decoded from a predefined number of positioning signals (e.g., four distinct positioning signals) associated with different satellite transmitters to determine, for example, its longitude, latitude, and altitude/elevation. The GPSS receiver typically maintains a number of ranging codes larger than the predefined number to increase the chances of receiving and successfully decoding a sufficient number (or the predefined number) of positioning signals at any point of time.

Some modernized satellite vehicles (SVs) broadcast or otherwise transmit both an in-phase signal (or component) and a quadrature-phase signal (or component) that is in quadrature with the in-phase signal. Generally, each of the in-phase signal and quadrature-phase signal has a primary pseudo-random PRN code (or a primary code) and a secondary (e.g., Neuman-Hoffman) PRN code (or a secondary code). Typically, the primary code is unique for each modernized SV and the secondary code is common for all modernized SVs. For example, a GPS L5 signal has an in-phase code L5I and a quadrature-phase code L5Q. The primary code for each of the L5I signal and the L5Q signal has a code length of 10230 chips that repeats every millisecond (ms) to give a code rate of 10.23e6 chips per second. The secondary code for the L5I signal has a 10-chip code length and repeats every 10 ms. Thus, each secondary code for the L5I signal is 1 ms, which is equal to one primary code epoch of 10230 chips. On the other hand, the secondary code for the L5Q signal has a 20-chip length and repeats every 20 ms. Further, the L5I signal is modulated with navigation data at a symbol rate of 100 symbols per second (or 10 milliseconds (ms) for each symbol), whereas the L5Q signal is a pilot channel with no navigation data modulated thereon. Therefore, the purpose of the secondary code is to speed up bit synchronization, and thus, the secondary code of the L5I signal and the navigation data are time aligned so that the duration of the secondary code period of the L5I signal corresponds to a data symbol (e.g., data bit) interval of the navigation data. Accordingly, the presence of the navigation data on the L5I signal can complicate the secondary code phase determination.

SUMMARY

In one aspect, the inventive concepts disclosed herein are directed to a receiver device. The receiver device is configured to receive an incoming radio frequency (RF) satellite signal from a satellite vehicle, and includes a circuit. The circuit is configured to track the incoming RF satellite signal in code phase and carrier frequency, the incoming RF satellite signal having a primary pseudorandom (PRN) code and a secondary PRN code modulated thereon, the secondary PRN code time-aligned with navigation data so that a duration of a secondary PRN code period corresponds to a data symbol interval of the navigation data. The circuit is configured to generate an encoded sequence of dot product values of adjacent integrated in-phase (I) and quadrature-phase (Q) components of the incoming RF satellite signal. The circuit is configured to compare the encoded sequence with expected secondary code chip transitions. The circuit is configured to determine a secondary code phase for the secondary PRN code based on the comparison. The circuit is configured to coherently integrate the secondary code phase with the incoming RF satellite signal to increase an integration interval. The circuit is configured to determine a secondary code phase for the secondary PRN code based by identifying one or more altered secondary code chip transitions within the encoded sequence, each altered secondary code chip transitions corresponding to a navigation data symbol transition. The circuit is configured to identify a starting position of the secondary PRN code based on a position of each of the one or more altered secondary code chip transitions.

In some embodiments, the circuit is configured to coherently integrate the secondary code phase with the incoming RF satellite signal.

In some embodiments, the receiver device is part of a global navigation satellite system (GNSS) receiver.

In some embodiments, the starting position of the secondary PRN code corresponds to the position within a repeating encoded sequence having a highest number of altered secondary code chip transitions.

In some embodiments, the circuit is configured to align the starting position of the secondary PRN code within the incoming RF satellite signal and to track the incoming RF satellite signal over an increased integration interval.

In some embodiments, the circuit is configured to identify the navigation data over the increased integration interval, decode the navigation data, and compute location information from the navigation data.

In some embodiments, other positions within the encoded sequence have either zero or less than a predefined number of changed symbol transitions.

In some embodiments, the incoming RF satellite signal includes a pilot signal having no navigation data.

In some embodiments, the circuit is configured to identify a repeating pattern from among secondary code chip transitions within the encoded sequence and determine a sample offset from the repeating pattern corresponding to a first position of the secondary code chip transitions, the first position corresponding to the starting position of the secondary PRN code within the incoming RF satellite signal.

This summary is provided solely as an introduction to subject matter that is fully described in the Detailed Description and Drawings. The summary should not be considered to describe essential features nor be used to determine the scope of the Claims. Moreover, it is to be understood that both the foregoing summary and the following Detailed Description are example and explanatory only, and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
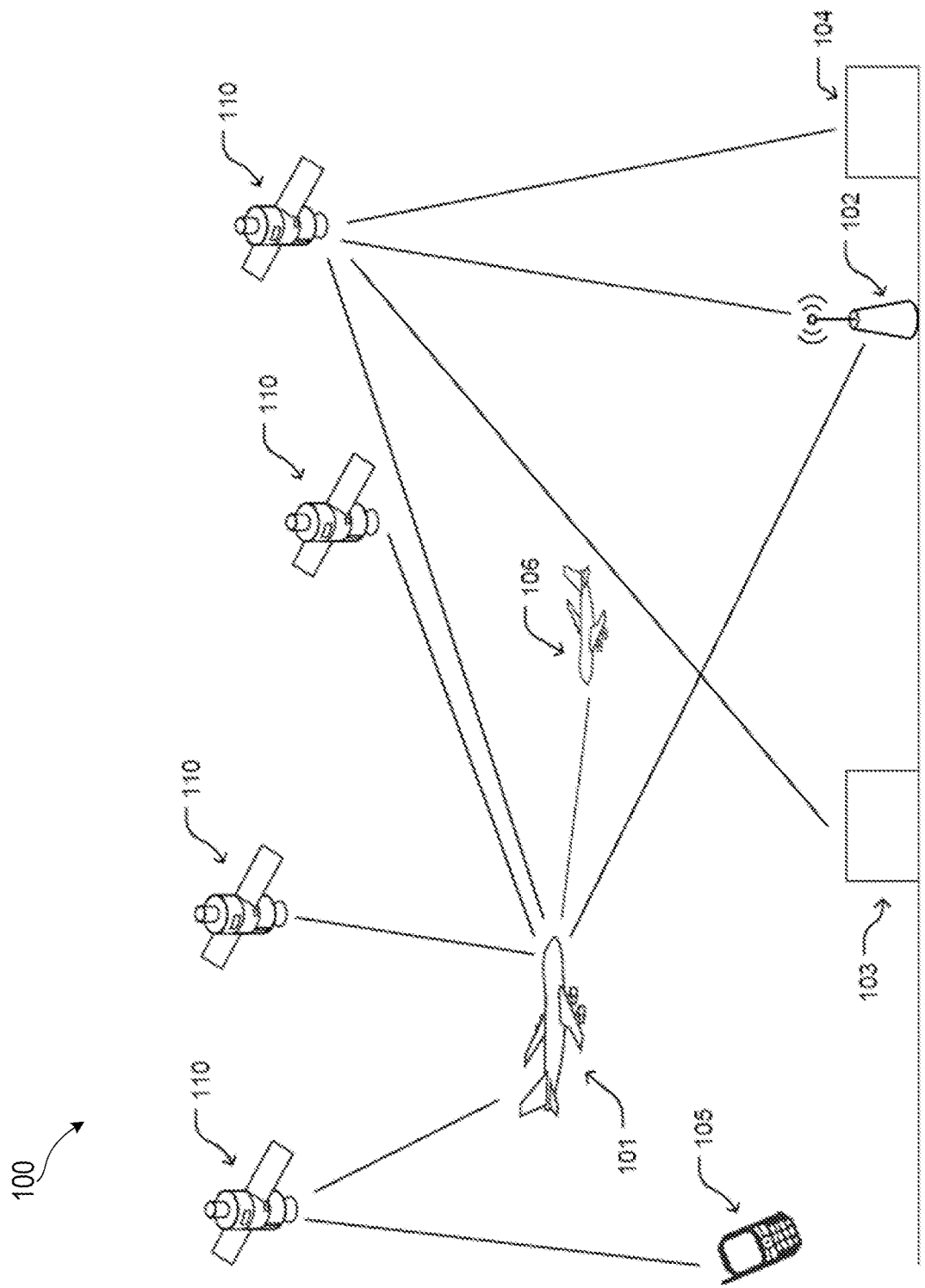
FIG. 1 is a schematic diagram of a communication network for communication with GNSS satellite vehicles, according to some inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, some embodiments of the inventive concepts disclosed herein are directed to systems and methods for real-time GNSS processing to determine secondary code phase to detect more power out of the received signal and to extend the integration interval (or period). The inventive concepts disclosed herein can be utilized in a number of control systems for various types of electronic avionics applications for airborne platforms (e.g., aircraft), including but not limited to flight control and autopilot systems, navigation systems, flight display systems, communications systems, radar systems, electric power systems, engine control systems, and monitor warning systems. While the inventive concepts disclosed herein are described in connection with systems and methods implementable for a platform, the inventive concepts disclosed herein may be used in any type of environment (e.g., in another aircraft, a spacecraft, an autonomous vehicle, a ground-based vehicle, a water-based or underwater vehicle, a subsurface or subterranean vehicle, a satellite, an aeronautical platform or a drone, or in a vehicle or non-vehicle application such as a stationary communications, a drone control center, sensing, or testing system, a ground-based display system, an air traffic control system, a radar system, a virtual display system, a portable electronic device, or a hand-held location tracking device). In some embodiments, the systems and methods described herein may be implemented for GPS/GNSS communications and calculations, or other signal processing devices which rely on secondary code phase determinations.

In some embodiments, a receiver device includes a radio frequency receiver and a processing circuit. The radio frequency receiver is configured to receive an incoming signal, the incoming signal including a radio frequency (RF) satellite signal from a satellite vehicle (SV). In some embodiments, the receiver device can be integrated with an airborne platform or other platform as described herein. For example, the systems and methods for GNSS processing described herein can be associated with avionics controllers or other critical electronic devices, such as those in an aircraft cockpit or control center, of the airborne platform. However, the present disclosure is not limited thereto, and in other embodiments, the receiver device can be integrated with a ground-based (e.g., stationary) platform, a mobile ground platform, a maritime platform, a portable electronic device (e.g., handheld device), and/or the like.

Systems manufactured in accordance with the inventive concepts disclosed herein can improve the operation of GNSS receiver hardware (including GPS receiver electronics), as well as portable electronic devices or aircraft or other airborne platforms including GNSS receiver hardware, by increasing or maximizing the integration interval through alignment of the secondary code. These improvements can allow for more accurate navigation and/or targeting applications by allowing the receiver to detect more power from the received signal through coherent integration over a longer integration interval (or period). These improvements can also improve GNSS technologies by allowing for concurrent (or simultaneous) detection of the secondary code phase and navigation data symbol transitions on the data signal (e.g., L5I), which can be complicated by the presence of navigation data on the data signal.

Referring now to FIG. 1, a communication network 100 is shown according to an exemplary embodiment of the inventive concepts disclosed herein. The communication network 100 includes various platforms including an airborne platform 101, a ground-based (e.g., stationary) platform 102, a mobile ground platform 103, a maritime platform 104, and/or a portable electronic device 105 (e.g., handheld device). It will be appreciated that various other communications devices may be included in the communication network 100 so as to communicate with the one or more satellite vehicles 110. The various platforms can be configured to transmit/receive (e.g., via one or more receiver/transmitter/transceiver hardware devices) radio frequency signals to/from various remote sources. The platforms can receive incoming signals (e.g., radio frequency signals such as GNSS/GPS signals) from one or more satellite vehicles 110 along various lines of sight. The platforms can receive signals from other platforms; for example, as shown in FIG. 1, the airborne platform 101 is configured to receive signals from remote sources, such as the ground-based platform 102 and from one or more remote airborne platforms 106. The lines of sight to the various remote sources may overlap. As the platforms (e.g., airborne platform 101) change in position and/or orientation relative to the remote sources, the platforms may lose or have to reset tracking of the signals. Radio frequency signals may be reflected by various platforms or the ground, complicating tracking of the remote sources. Similarly, in a multi-path environment (not shown), such as an urban environment for communication with portable electronic devices, each signal may be received by the platforms along two or more paths.

Figure 2:
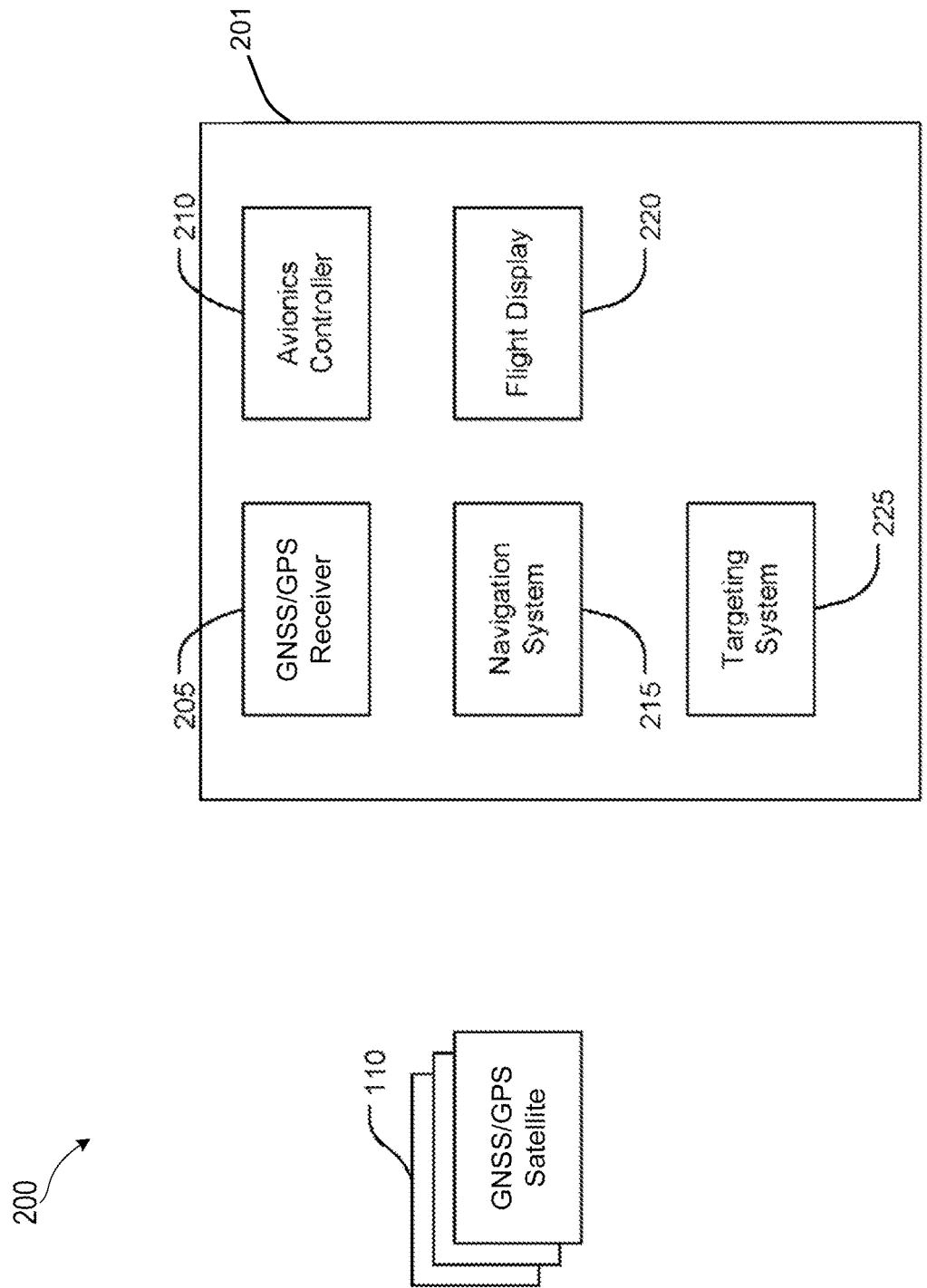
FIG. 2 is a block diagram of a system, according to some inventive concepts disclosed herein.

Referring now to FIG. 2, a block diagram of a system 200 is shown according to an exemplary embodiment of the inventive concepts disclosed herein. The system 200 can be configured to calculate a range to one or more satellite vehicles 110 (e.g., GNSS satellite vehicles), such as for determining the location of a vehicle 201 or an electronic device associated with the vehicle 201. In various embodiments, the vehicle 201 can be any suitable vehicle, platform, or device that uses GNSS/GPS based location tracking. For example, the vehicle 201 can be the airborne platform 101, the ground-based (e.g., stationary) platform 102, the mobile ground platform 103, the maritime platform 104, or the portable electronic device 105 (e.g., handheld device) described with reference to FIG. 1. For convenience, the vehicle 201 will be described in the context of the airborne platform 101. In this case, the vehicle 201 includes a GPS/GNSS receiver 205, an avionics controller 210, a navigation system 215, a flight display 220, and a targeting system 225. However, the present disclosure is not limited thereto, and as noted above, the inventive concepts disclosed herein may be implemented in various platforms including ground-based platforms or portable electronic devices; for example, the avionics controller 210 in various embodiments may be configured as a controller specific to the platform implemented on the vehicle 201.

One or more components of the vehicle 201 (e.g., GNSS receiver 205, avionics controller 210) may include a processing circuit. The processing circuit (e.g., control circuits, processing electronics) can include a processor and memory. The processor may be implemented as a specific purpose processor, an application specific integrated circuit (ASIC), one or more field programmable gate arrays (FPGAs), a group of processing components, or other suitable electronic processing components. The memory is one or more devices (e.g., RAM, ROM, flash memory, hard disk storage) for storing data and computer code for completing and facilitating the various user or client processes, layers, and modules described in the present disclosure. The memory may be or include volatile memory or non-volatile memory and may include database components, object code components, script components, or any other type of information structure for supporting the various activities and information structures of the inventive concepts disclosed herein. The memory is communicably connected to the processor and includes computer code or instruction modules for executing one or more processes described herein. The memory includes various circuits, software engines, and/or modules that cause the processor to execute the systems and methods described herein.

In some embodiments, the GNSS receiver 205 is configured to receive incoming signals including radio frequency satellite signals from the one or more satellite vehicles 110. The GNSS receiver 205 can include an antenna configured to receive radio frequency signals. The GNSS receiver 205 can be configured to execute computational processes on the received radio frequency signals, including determining a location associated with the GNSS receiver 205 based on processing one or more received radio frequency signals. The GNSS receiver 205 can be configured to determine the secondary code phase to perform coherent integration over more of the received signal to track the received signal at a higher power level over an extended or maximum integration period. The GNSS receiver 205 can execute signal tracking channels which correlate the received radio frequency signals to predetermined code signals in order to calculate pseudorange values (e.g., code position measurements, carrier phase measurements, and/or the like) corresponding to each satellite vehicle 110. The GNSS receiver 205 can be configured to generate and output position data regarding the determined location associated with the GNSS receiver 205 using the pseudorange values. The GNSS receiver 205 can execute various functions according to the inventive concepts disclosed herein (e.g., as described with reference to receiver device 305 of FIG. 3) to improve tracking performance by detecting more power out of the received signal.

The avionics controller 210 can be configured to control various components of the airborne platform 101, such as engine control functions, navigation functions, or flight control functions. The avionics controller 210 can be configured to receive the position data from the GNSS receiver 205 and cause the flight display 220 to display information based on the position data. As noted above, in various embodiments, the vehicle 201 may include a controller specific to the airborne platform 101.

The navigation system 215 can use the position data (e.g., location associated with the GNSS receiver 205) to execute navigation functions. For example, the navigation system 215 can use the position data to display a location of vehicle 201 (e.g., of an airborne platform 101), to update a flight plan, to calculate distances and ranges to remote locations or targets, or to calculate state data (e.g., speed, heading).

The position data generated in accordance with the inventive concepts disclosed herein can be implemented in various navigation functions. For example, as described herein, pseudorange calculated by the GNSS receiver 205 (and/or receiver device 305 described with reference to FIG. 3) can be provided to the navigation system 215. Pseudorange calculated by multiple receiver devices can be combined, such as in aviation implementations as well as GNSS/GPS surveying implementations. One or more of the multiple receiver devices may calculate pseudorange according to the inventive concepts disclosed herein. The multiple receiver devices may be spatially separated from one another and/or autonomously operated, so that the navigation system 215 combines position data from such multiple devices. The navigation system 215 can use the position data together with position and/or orientation data from various other sensors or navigational aids such as an inertial navigation system, a wheel sensor, or Doppler aiding.

The flight display 220 can include one or more displays. The flight display 220 can be provided in an aircraft cockpit or control center, such as for display to a pilot and/or co-pilot. The flight display 220 can be configured to display flight critical information. The flight display 220 can be configured to display information based on position data received from the GNSS receiver 205, such as to display a position of the airborne platform 101, as well as a flight plan map which may be displayed along with the position of the airborne platform 101.

The targeting system 225 can use the position data to calculate targeting parameters. For example, the targeting system 225 can use the position data to calculate a distance to a target, and accordingly calculate a desired targeting trajectory to the target. In various embodiments, the increase in accuracy and/or reduction in error of the position data provided by the inventive concepts disclosed herein can improve operation of the targeting system 225 by improving the accuracy and precision of targeting solutions.

Figure 3:
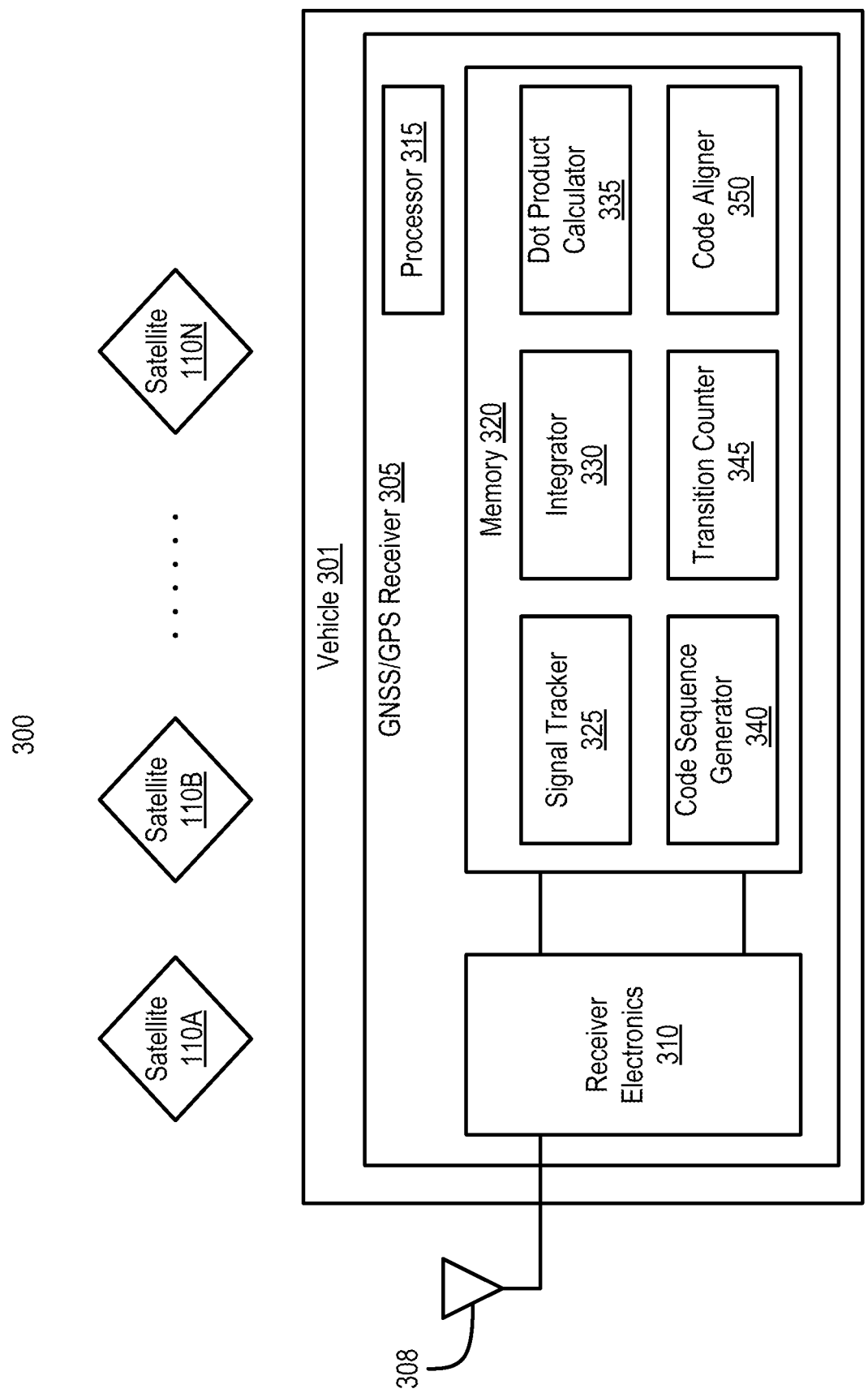
FIG. 3 is a block diagram of a location identification system, according to some inventive concepts disclosed herein.

Referring now to FIG. 3, a block diagram of a location identification system 300 is shown according to an exemplary embodiment of the inventive concepts disclosed herein. The system 300 can implement features of the system 200 described with reference to FIG. 2 (e.g., the GNSS/GPS receiver 205). For example, the system 300 may include one or more components of system 200 as detailed above, such as the vehicle 301 and the one or more satellite vehicles 110A-N (hereinafter generally referred to as satellite 110). The vehicle 301 can be any suitable vehicle, platform, or device that uses GNSS/GPS based location tracking. For example, the vehicle 301 can be the airborne platform 101, the ground-based (e.g., stationary) platform 102, the mobile ground platform 103, the maritime platform 104, or the portable electronic device 105 (e.g., handheld device) described with reference to FIG. 1. In some embodiments, the vehicle 301 may include or may be installed with a radio frequency antenna 308 and a GNSS/GPS receiver 305.

In accordance with GNSS protocols, each satellite 110 may transmit or broadcast a signal (e.g., radio frequency signals such as GNSS/GPS signals). The signal may have a carrier frequency, a wavelength, an encoding, and a modulation, among other characteristics as specified by the GNSS protocol. The carrier frequencies may be a multiple of a fundamental frequency set by the GNSS protocol. In some embodiments, the fundamental frequency may be 10.23 MHz. The messages encoded in the signal may include a status message and ephemeris data. The ephemeris data may indicate a position of the satellite 110 in orbit around the Earth. In some embodiments, the signal transmitted by the satellite 110 may be, for example, a L5 GPS signal having a carrier frequency of 1176.45 MHz (10.23 MHz×115) and a wavelength of 25.48 cm. However, in other embodiments, the signal may be any suitable modernized GNSS/GPS signal transmitted or otherwise broadcast by the satellite 110 (e.g., Galileo E1B/C or E5a signals).

The antenna 308 may receive the one or more signals from the one or more corresponding satellites 110 within range (or view) of the antenna 308. The antenna 308 may be mounted on the vehicle 301, and in some embodiments, the antenna 308 may include a plurality of antennas (e.g., dual antennas) that are separated by a baseline length. In some embodiments, the antenna 308 may be a half-wave dipole, a dipole antenna (e.g., corner reflector or log-periodic), a monopole antenna (e.g., whip, mast, umbrella, or inverted F), a travelling wave antenna (e.g., helical or spiral), reflector antenna (e.g., corner or parabolic), an aperture antenna (e.g., parabolic, slot, horn, or dielectric), a microstrip antenna, an array antenna (e.g., phased array antenna, electronically scanned array (ESA) with a phase shifter, collinear array, planar array, and conformal array), a loop antenna, and/or the like, or any suitable combination thereof.

From the antenna 308, the GNSS/GPS receiver 305 may obtain pseudorange measurements and carrier phase measurements for the one or more satellites 110 within the range (or view) of the antenna 308. The pseudorange measurement may be an approximated distance from the antenna 308 to the satellite 110 corresponding to the received signal. The carrier phase measurement may be a number of cycles in the signal between the antenna 308 and the satellite 110 corresponding to the received signal. In some embodiments, the pseudorange measurements and carrier phase measurements may be obtained by the GNSS/GPS receiver 305 at measurement epochs. The measurement epoch may be a sampling interval for obtaining the pseudorange measurements and carrier phase measurements of the signals of the satellites 110 within the range received via the antenna 308. In some embodiments, the sampling interval may range from a few hundredths of a second to hours. In some embodiments, the GNSS/GPS receiver 305 may calculate, determine, or otherwise obtain the pseudorange measurements and carrier phase measurements based on the received signals from the one or more satellites 110. In some embodiments, the received signals may have a single carrier frequency. In some embodiments, the received signals may have dual or multiple carrier frequencies.

The receiver 305 includes receiver electronics 310, one or more processors 315, and memory 320. The processors 315 may be configured to execute computer code and/or program instructions stored in the memory 320 or received from other computer readable media (e.g., CDROM, network storage, a remote server, etc.). The processors 315 can be implemented on one or more processing circuits using various electronic components similar to those described with reference to FIG. 2. For example, in some embodiments, the processors 315 may include a microprocessor unit, an application-specific integrated circuit (ASIC), and/or a field-programmable gate array (FPGA), among others. The processors 315 may also be a multi-core processor or an array of processors. The memory 320 may include electronic, optical, magnetic, or any other storage device capable of relaying or providing the processor with program instructions. The memory 320 may include, for example, a floppy disk, CD-ROM, DVD, magnetic disk, memory chip, Static random-access memory (SRAM), Burst SRAM or SynchBurst SRAM (BSRAM), Dynamic random-access memory (DRAM), Ferroelectric RAM (FRAM), NAND Flash, NOR Flash, and Solid State Drives (SSD), among others, or any combination thereof. The program instructions may include code from any programing language, such as C, C++, C#, Java, JavaScript, Perl, HTML, XML, Python, Visual Basic, et cetera, or any combination thereof.

The receiver electronics 310 can include or be coupled to the antenna 308 which receives the incoming radio frequency signals. The antenna 308 can receive incoming radio frequency signals which include satellite vehicle signals from one or more satellite vehicles 110. For example, the incoming radio frequency signals can include signals transmitted from a plurality of the satellite vehicles 110 as illustrated in FIG. 1. The radio frequency antenna 308 can generate radio frequency data (e.g., an electrical or optical signal encoding the radio frequency data) based on the incoming radio frequency signals. The radio frequency data can include (e.g., encode) signals from one or more satellite vehicles 110. In some embodiments, the receiver electronics 310 can amplify and/or filter the radio frequency signals. In some embodiments, the receiver electronics 310 can down convert the radio frequency signals, which can allow for more efficient processing by the processors 310. In some embodiments, the receiver electronics 310 can receive and process incoming radio frequency signals including satellite signals on multiple frequencies or bands (e.g., L1 signal, L2 signal, L5 signal, and/or the like).

In various embodiments, the receiver 305 identifies the secondary code phase of the received signal and aligns the secondary code phase to coherently integrate over a longer integration interval (or period). In some embodiments, the receiver 305 identifies the secondary code phase for the pilot signal (e.g., the quadrature-phase signal such as L5Q). For example, in some embodiments, the secondary code phase is determined from the unique known repeating pattern (or chip transitions) of the secondary code sequence. In some embodiments, the receiver 305 identifies the secondary code phase and navigation data symbol transitions concurrently (or simultaneously) on the data signal (e.g., the in-phase signal such as L5I). For example, in some embodiments, the secondary code phase is determined from the unique known pattern of chip transitions of the secondary code sequence and the potential effects of navigation data symbol transitions on the pattern of secondary code chip transitions. In various embodiments, once the secondary code phase is determined, the beginning of the secondary code can be aligned in the received signal to coherently integrate the received signal over an extended integration period. Accordingly, tracking performance can be improved by detecting more power from the received signal.

Still referring to FIG. 3, in some embodiments, the receiver 305 includes a signal tracker 325, an integrator 330, a dot product calculator 335, a code sequence generator 340, a transition counter 345, and a code aligner 350. In some embodiments, the signal tracker 325 acquires and/or tracks the received signal in code phase and carrier frequency. For example, in some embodiments, the signal tracker 325 tracks the received pilot signal (e.g., L5Q) and/or data signal (e.g., L5I) for each primary code epoch integration time (e.g., 1 ms) in code phase and carrier frequency. Once the pilot signal (e.g., L5Q) and/or the data signal (e.g., L5I) has been tracked for one primary code epoch integration time, then for each of the primary code epochs, the integrator 330 outputs integrated in-phase I and quadrature Q component values. In some embodiments, in the case of no navigation data symbol transitions (e.g., the pilot signal) so that only the primary code and the secondary code are modulating on the satellite signal, the absolute values of the integrated I and Q components over each of the primary code epochs are the same, except that the secondary code changes the signs of the I and Q values for respective ones of the primary code epochs.

In some embodiments, to observe the impact of the secondary code across multiple primary code epochs, the dot product calculator 335 computes adjacent dot products of the integrated signal I/Q (complex) components from consecutive primary code epochs of the pilot signal and/or the data signal, and the code sequence generator 340 generates an encoded sequence of dot product values output by the dot product calculator 335. For example, assuming that "1" is coded for the positive dot product of a current and previous integrated I/Q signal components of two consecutive code epochs and "−1" is coded for the negative dot product of a current and previous integrated I/Q signal components of two consecutive code epochs, then the dot product will be positive if two consecutive primary code epochs have the same secondary code value (e.g., both is either "0" or "1") and the dot product will be negative if two consecutive code epochs have different secondary code values (e.g., one is "0" and the other is "1").

In this case, as a non-limiting example, for a known or predetermined 10-chip code length secondary code sequence "0000110101" (repeating every 10 ms) of a signal having no navigation data symbol transitions (e.g., a pilot signal), the code sequence generator 340 may generate the encoded sequence (of dot product values output by the dot product calculator 335) of "−1,1,1,1,−1,1,−1,−1,−1,−1" (which repeat every 10 ms) of the secondary code chip transitions, where the first "−1" in one period of the encoded sequence is due to the first "0" of a current secondary code sequence period and the last "1" of a previous secondary code sequence period. Thus, in this example, the encoded sequence of one secondary code period results in chip transitions having six "−1s" and four "1s." Further, over 10 ms intervals (sampled starting at arbitrary times) in this example, the code sequence generator 340 can generate one of the following encoded sequence chip transition patterns shown in the below table that repeats every 10 ms, each also resulting in six "−1s" and four "1s":

| Sample Offset | Generated Pattern | Comments |
|---|---|---|
| 0 Offset | −1, 1, 1, 1, −1, 1, −1, −1, −1, −1 | Samples taken at start of the secondary code period |
| 1 Offset | 1, 1, 1, −1, 1,−1, −1, −1, −1, −1 | First data element has been rotated to the tail of the sequence |
| 2 Offset | 1, 1, −1, 1, −1, −1, −1, −1 −1, 1 | First and second data elements have been rotated to the tail of the sequence |
| 3 Offset | 1, −1, 1, −1, −1, −1, −1, −1, 1, 1 | First three data elements have been rotated to the tail of the sequence |
| 4 Offset | −1, 1, −1, −1, −1, −1, −1, 1, 1, 1 | First four data elements have been rotated to the tail of the sequence |
| 5 Offset | 1, −1, −1, −1, −1 −1, 1, 1, 1, −1 | First five data elements have been rotated to the tail of the sequence |
| 6 Offset | −1, −1, −1, −1, −1, 1, 1, 1, −1, 1 | First three six elements have been rotated to the tail of the sequence |
| 7 Offset | −1, −1, −1, −1, 1, 1, 1, −1, 1, −1 | First seven data elements have been rotated to the tail of the sequence |
| 8 Offset | −1, −1, −1, 1, 1, 1, −1, 1, −1, −1 | First eight data elements have been rotated to the tail of the sequence |
| 9 Offset | −1, −1, 1, 1, 1, −1, 1, −1, −1, −1 | First nine data elements have been rotated to the tail of the sequence |

On the other hand, if 10 ms navigation data symbol transitions are modulated on the signal (e.g., a data signal), then the navigation data symbol transitions are synchronous to the start of the secondary code period. Thus, the navigation data symbol transitions would alter the first data element (e.g., by changing the sign of the first position of the secondary code chip transitions) corresponding to the sample start time of 0 offset (e.g., the start of the secondary code period), and the altered encoded sequence would include five "−1s" and five "1s" (instead of six "−1s" and four "1s" in the case of the secondary code sequence in this example). Similarly, depending on the sample time (e.g., sample offset), instead of generating one of the other nine patterns shown in the above table, the code sequence generator 340 would generate one of nine altered patterns that are different from corresponding ones of the original nine patterns for the secondary code sequence in only one data element (e.g., one chip transition), which is where the changed data element (e.g., the first data element) is rotated into the altered pattern due to the navigation data symbol transitions. However, each of the nine altered patterns would also include five "−1s" and five "1s" (instead of six "−1s" and four "1s" in the case of the secondary code chip transitions without navigation data symbols in this example). That is, the pattern (or number of "−s" and/or "1s") will correspond to the expected encoded sequence of the predetermined secondary code if there are no navigation symbol transitions (e.g., for a pilot signal), or will be different (e.g., less "−1s" and more "1s") from the expected encoded sequence by one position of the secondary code chip transitions having a changed sign if there are navigation symbol transitions (e.g., for a data signal).

Accordingly, in some embodiments, the transition counter 345 compares the encoded sequence of the received signal generated by the code sequence generator 340 with an expected encoded sequence (e.g., the secondary code chip transitions) corresponding to the known or predetermined secondary code. For example, since the secondary code is known in advance (e.g., predetermined), the expected encoded sequence for any given secondary code may also be predetermined. In this case, the transition counter 345 can retrieve the expected encoded sequence of the predetermined secondary code stored in a data store (e.g., a lookup table), and compare the encoded sequence of the received signal with the expected secondary code chip transitions. For example, in some embodiments, the transition counter can count the number of "−1s" and/or "1s" in the encoded sequence of the received signal with the expected number of "−1s" and/or "1s" of the secondary code chip transitions. In another example, in some embodiments, the transition counter can compare the pattern of the encoded sequence of the received signal with one or more patterns (e.g., sample offsets) of the expected secondary code chip transitions.

In some embodiments, in the case of the pilot signal, the transition counter determines if the encoded sequence of the received signal matches one of the expected secondary code chip transitions in intervals corresponding to the chip length of the secondary code (e.g., 10 ms, 20 ms, or the like) for the pilot signal. Because the pilot signal does not include navigation symbol transitions, one of the original patterns of the predetermined encoded sequence for the secondary code (e.g., the secondary code chip transitions) will emerge as repeating every secondary code period depending on the sample starting time (e.g., sample offset). In this case, once a match is determined, the code aligner 350 can determine the beginning of the secondary code phase based on the sample time (or offset) of the matched pattern. The code aligner 350 uses this information to compute the current secondary code phase for the pilot signal, and to align the secondary code phase with the received signal to extend the integration interval so that the received signal can be tracked at a higher power level over a longer integration period.

In some embodiments, in the case of the data signal, the transition counter 345 detects navigation data symbol transitions by observing (or comparing) the encoded sequence of the received signal with the expected secondary code chip transitions of the data signal in intervals corresponding to the chip length (e.g., 10 ms, 20 ms, or the like) of the secondary code. Because the data signal includes navigation data symbol transitions, the navigation data symbol transitions will alter the secondary code chip transitions by one position for a secondary code period resulting in a different pattern (e.g., less "−1s" and more "1s"). For example, referring again to the above non-limiting example of "0000110101" for the predetermined secondary code, the repeating pattern of the secondary code chip transitions will include six "−1s" and four "1s" when there are no navigation data symbol transitions (e.g., in the case of the pilot signal) and five "−1s" and five "1s" if there are navigation data symbol transitions (e.g., in the case of the data signal). Further, the altered secondary code chip transitions by the navigation data symbol transitions will occur at the same positions in the encoded sequence intervals (e.g., 10 ms in this example), which indicates the beginning of the secondary code phase for the data signal.

In some embodiments, in the case of the data signal, the code aligner 350 determines the secondary code phase by tracking a position of the altered secondary code chip transition by the navigation data symbol transition for each encoded sequence interval (e.g., 10 ms) of the received signal. For example, after tracking the position of the altered secondary code chip transitions over a period of time (e.g., 2 seconds), which may be a predetermined duration as a tradeoff between confidence level and the time required to perform the processing, the code aligner 350 determines the position within the secondary code chip transitions having a large or greatest number of altered symbol transitions by the navigation data. In this case, the other positions should have zero (or a negligible number that may be due to interference) altered symbol transitions. In this case, the position in the encoded sequence that indicates the altered symbol transitions correspond to the start of the secondary code period. The code aligner 350 uses this information to compute the current secondary code phase for the data signal, and to align the secondary code phase with the received signal to extend the integration interval so that the received signal can be tracked at a higher power level over a longer integration period.

Figure 4:
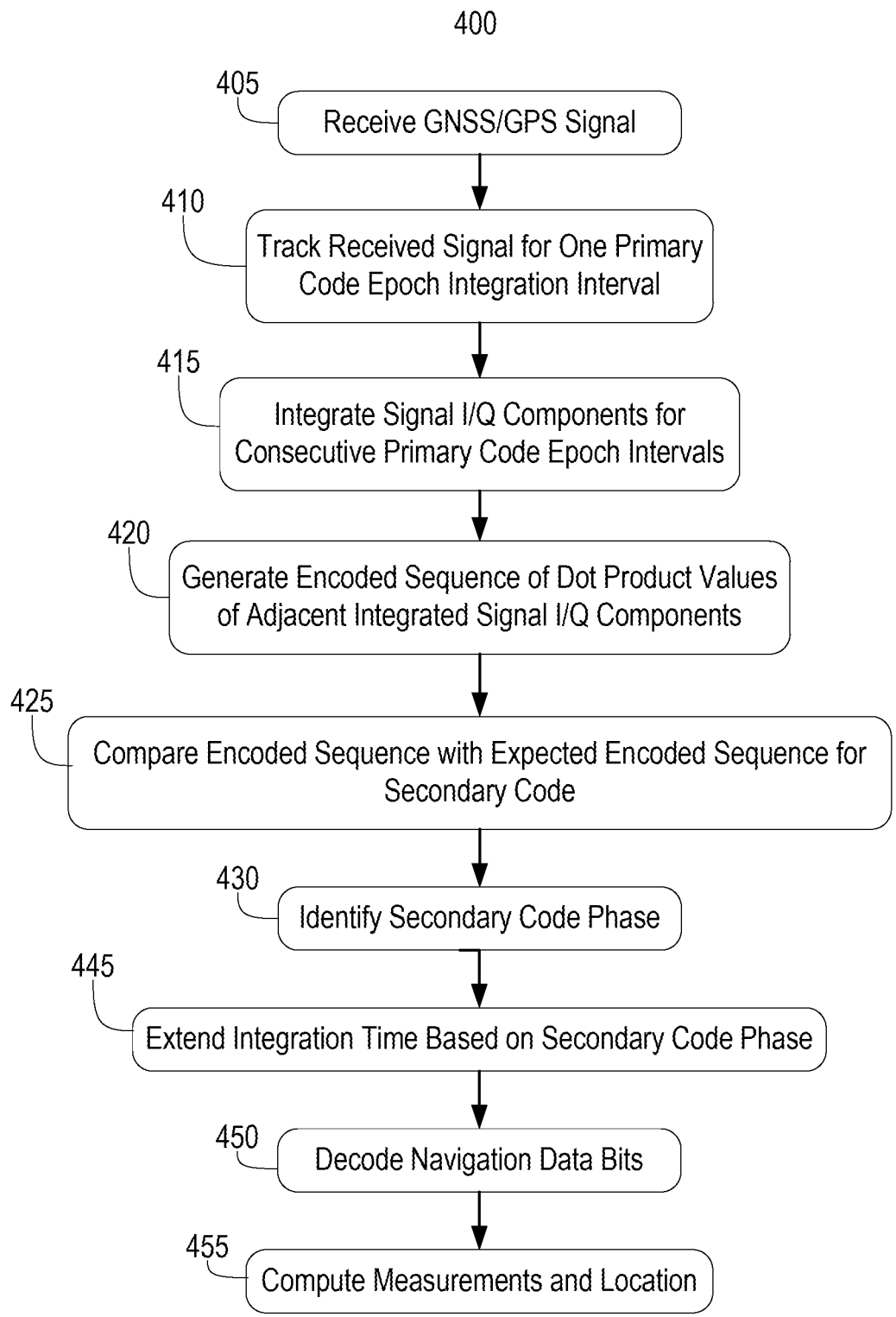
FIG. 4 is a flow diagram of a process or method implementing one or more aspects of the inventive concepts disclosed herein, according to some inventive concepts disclosed herein.

FIG. 4 shows a flow diagram of a process or method 400 implementing one or more aspects of the inventive concepts disclosed herein, according to an exemplary embodiment. The process 400 may be executed using various hardware, apparatuses, and systems disclosed herein, such as one or more of the platforms or portable electronic device of the communication network 100, the systems 200 and 300, the GNSS/GPS receivers 205 and 305, and/or components or features thereof.

Referring to FIG. 4, a GNSS/GPS signal is received at block 405. The received GNSS/GPS signal includes a radio frequency satellite signal from a satellite vehicle. The received signal may be received by a radio frequency receiver (e.g., radio frequency antenna). A plurality of satellite signals may be received from a plurality of satellite vehicles to form portions of the received signal. In some embodiments, the received signal may include a data signal (e.g., L5I) and a pilot signal (e.g., L5Q). In some embodiments, each of the data signal and the pilot signal includes a primary pseudorandom (PRN) code (or primary code) and a secondary PRN code (or secondary code). In some embodiments, the secondary code for the data signal is time aligned with navigation data symbol transitions so that the duration of a secondary code period corresponds to a data symbol interval of the navigation data.

The received signal (e.g., data signal and/or pilot signal) is tracked for one primary code epoch integration interval (e.g., 1 ms) at block 410. For example, in some embodiments, the signal tracker 325 acquires and/or tracks the received signal in code phase and carrier frequency for each primary code epoch integration interval. The signal's in-phase and quadrature-phase I/Q components are integrated for consecutive primary code epoch intervals at block 415. For example, in some embodiments, the integrator 330 outputs integrated in-phase I and quadrature Q component values.

The encoded sequence of dot product values of adjacent integrated signal I/Q components is generated at block 420. For example, in some embodiments, the dot product calculator 335 computes adjacent dot products of the integrated signal I/Q components, and the code sequence generator 340 generates an encoded sequence of the dot product values. The encoded sequence for the received signal is compared with expected secondary code chip transitions for the secondary code at block 425. For example, in some embodiments, the transition counter 345 compares the encoded sequence with the secondary code chip transitions in the expected encoded sequence for each sample offset to identify a match in the case of the pilot signal. In another example, the transition counter 345 compares the encoded sequence with the secondary code chip transitions for each of the sample offsets to identify a position of a data element in the encoded sequence having a navigation data symbol transition in the case of the data signal. In this case, the position of the data element in the encoded sequence will have a sign change (e.g., "−1" or "1") when compared to the secondary code chip transitions corresponding to the sample offset.

The secondary code phase is identified at block 430. For example, the code aligner 350 determines the offset position of the secondary code chip transitions in the case of the pilot signal, or tracks the position of the altered secondary code chip transitions by the navigation data symbol transitions in the case for the data signal for each encoded sequence interval (e.g., 10 ms, 20 ms, or the like) of the received signal. In the case of the data signal, after tracking the positions of the changed symbol transitions (corresponding to the altered secondary code chip transitions) over a predetermined period of time (e.g., 2 seconds), the code aligner 350 determines the position having the largest or greatest number of changed symbol transitions as the start of the secondary code period. The code aligner 350 calculates the secondary code phase from the identified start position. The integration time is extended based on coherent integration of the secondary code phase at block 445. For example, the secondary code phase is aligned within the received signal and the integration interval is extended to coherently integrate over more of the signal as it is being received.

Navigation data symbols are determined based on the coherent integration of the secondary code phase and decoded at block 450. For example, after tracking the received signal over the extended integration period, the navigation data symbols are identified and decoded by the receiver 305. Then, measurements (e.g., pseudorange and carrier phase) and location information is computed at block 455. In some embodiments, the method 400 includes using the location information to execute navigation and/or targeting functions. For example, the location information may be displayed, navigation instructions may be updated based on the location information, a flight plan may be updated based on the location information, targeting instructions may be updated based on the location information, and/or the like.

As will be appreciated from the above, systems and methods for GNSS processing to identify the secondary code phase concurrently (or simultaneously) with the navigation data symbol transitions according to embodiments of the inventive concepts disclosed herein may improve operation of aircraft, other platforms, GNSS receiver electronics, and portable electronics devices by coherent integration over more of the signal to be able to track the signal at a higher power level. As such, the inventive concepts disclosed herein can improve GNSS signal processing technology, leading to more accurate/reliable position determination, navigation, and targeting operations.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A receiver device configured to receive an incoming radio frequency (RF) satellite signal from a satellite vehicle, comprising:
a circuit configured to:
track the incoming RF satellite signal in code phase and carrier frequency, the incoming RF satellite signal having a primary pseudorandom (PRN) code and a secondary PRN code modulated thereon, wherein the secondary PRN code is time aligned with navigation data so that a duration of a secondary PRN code period corresponds to a data symbol interval of the navigation data;
generate an encoded sequence of dot product values of adjacent integrated in-phase (I) and quadrature-phase (Q) components of the incoming RF satellite signal;
and
determine a secondary code phase for the secondary PRN code based on identifying one or more altered secondary code chip transitions within the encoded sequence, wherein the one or more altered secondary code chip transitions each corresponds to a navigation data symbol transition, and identifying a starting position of the secondary PRN code based on a position of each of the one or more altered secondary code chip transitions,
wherein the receiver device includes a global navigation satellite system (GNSS) receiver.

2. The receiver device of claim 1, wherein the circuit is configured to coherently integrate the secondary code phase with the incoming RF satellite signal to increase an integration interval.

3. The receiver device of claim 1, wherein the starting position of the secondary PRN code corresponds to the position within a repeating encoded sequence having a highest number of altered secondary code chip transitions.

4. The receiver device of claim 2, wherein the circuit is further configured to:
align the starting position of the secondary PRN code within the incoming RF satellite signal;
and
track the incoming RF satellite signal over an increased integration interval.

5. The receiver device of claim 4, wherein the circuit is further configured to:
identify the navigation data over the increased integration interval;
decode the navigation data;
and
compute location information from the navigation data.

6. The receiver device of claim 1, wherein one or more other positions within the encoded sequence have either zero or less than a predefined number of changed symbol transitions.

7. The receiver device of claim 1, wherein the incoming RF satellite signal includes a pilot signal having no navigation data.

8. The receiver device of claim 7, wherein the circuit is further configured to:
identify a repeating pattern from among secondary code chip transitions within the encoded sequence;
and
determine a sample offset from the repeating pattern corresponding to a first position of the secondary code chip transitions,
wherein the first position corresponds to the starting position of the secondary PRN code within the incoming RF satellite signal.

* * * * *